United States Patent
Nicholson et al.

(10) Patent No.: US 8,507,877 B2
(45) Date of Patent: Aug. 13, 2013

(54) NON-LINEAR OPTICAL SYSTEM AND TECHNIQUES

(75) Inventors: Jeffrey W. Nicholson, Warren, NJ (US); Siddharth Ramachandran, Boston, MA (US)

(73) Assignee: OFS Fitel, LLC, Norcross, GA (US)

( * ) Notice: Subject to any disclaimer, the term of this patent is extended or adjusted under 35 U.S.C. 154(b) by 0 days.

(21) Appl. No.: 12/954,292

(22) Filed: Nov. 24, 2010

(65) Prior Publication Data
US 2011/0210269 A1    Sep. 1, 2011

Related U.S. Application Data

(60) Provisional application No. 61/264,538, filed on Nov. 25, 2009, provisional application No. 61/265,271, filed on Nov. 30, 2009.

(51) Int. Cl.
*G01J 1/58*    (2006.01)

(52) U.S. Cl.
USPC .................................. 250/458.1; 250/459.1

(58) Field of Classification Search
USPC ...................................................... 250/458.1
See application file for complete search history.

(56) References Cited

U.S. PATENT DOCUMENTS

| | | | |
|---|---|---|---|
| 2005/0258375 A1* | 11/2005 | Mertz et al. | 250/458.1 |
| 2006/0012875 A1* | 1/2006 | Wolleschensky | 359/388 |
| 2006/0233554 A1* | 10/2006 | Ramachandran et al. | 398/141 |
| 2007/0290145 A1* | 12/2007 | Viellerobe et al. | 250/459.1 |
| 2010/0177376 A1* | 7/2010 | Arnold et al. | 359/307 |
| 2012/0093461 A1* | 4/2012 | Ramachandran | 385/28 |

FOREIGN PATENT DOCUMENTS

| | | |
|---|---|---|
| JP | 2003344776 A | 12/2003 |
| JP | 2004157246 A | 6/2004 |
| JP | 2006295195 A | 10/2006 |
| JP | 2007241280 A | 9/2007 |

* cited by examiner

*Primary Examiner* — Marcus Taningco
(74) *Attorney, Agent, or Firm* — Jacobs & Kim LLP (57) ABSTRACT

Methods and systems are described using a non-linear optical system comprising a laser and a light delivery system comprising a single mode fiber, a mode converter, and a high order mode fiber, wherein the light delivery system that receives light from the source and provides a structured free-space beam having an embedded Gaussian beam. The light delivery system functions to illuminate a region of a sample and generate a non-linear response in a spatial region smaller than that associated with a Gaussian beam having a width comparable to the width of the embedded Gaussian beam. In another aspect, the light delivery system illuminates a region of a sample and generates a non-linear emission of radiation, is depicted. A further aspect of this embodiment includes an imaging assembly for detecting the non-linear emission and using a signal derived from the detected emission to generate a microscopic image of the sample.

11 Claims, 12 Drawing Sheets

NON-LINEAR OPTICAL SYSTEM AND TECHNIQUES

CROSS REFERENCE TO RELATED APPLICATION

The present application claims the priority benefit of U.S. Provisional Patent Application Ser. No. 61/264,538, filed on Nov. 25, 2009, and U.S. Provisional Patent Application Ser. No. 61/265,271, filed on Nov. 30, 2009. These applications are incorporated by reference herein in their entirety.

BACKGROUND OF THE INVENTION

1. Field of the Invention

The present invention relates generally to non-linear optical systems, and in particular to improved non-linear optical systems and techniques employing higher-order mode optical fibers.

2. Background Art

In a non-linear optical system; such as a non-linear microscopy system, a pulsed laser beam is tightly focused onto a sample, causing an optical output to be generated therefrom. A non-linear signal can be derived from the optical output, and this non-linear signal can be used to generate a microscopic image of the sample. A number of different higher-order light-matter interactions may be used in a non-linear optical system, including two-photon fluorescence, second-harmonic generation, third-harmonic generation, Raman scattering, and the like. In a multiphoton emission process, the relationship between incident light intensity and emitted radiation is nonlinear. For example, for two-photon excitation, the relationship is quadratic. As a result of this nonlinear relationship, only the central spatial portion of a conventional Gaussian beam substantially contributes to the intensity of emitted radiation. Therefore, much more multiphoton radiation is generated where the laser beam is tightly focused than where it is more diffuse. Effectively, excitation is restricted to the focal volume, resulting in a high degree of rejection of out-of-focus objects Similar effects occur in other types of light-matter interactions, including second-harmonic generation, third-harmonic generation, Raman scattering, optically-induced chemical reactions, material breakdown and the like.

Figure 1A:
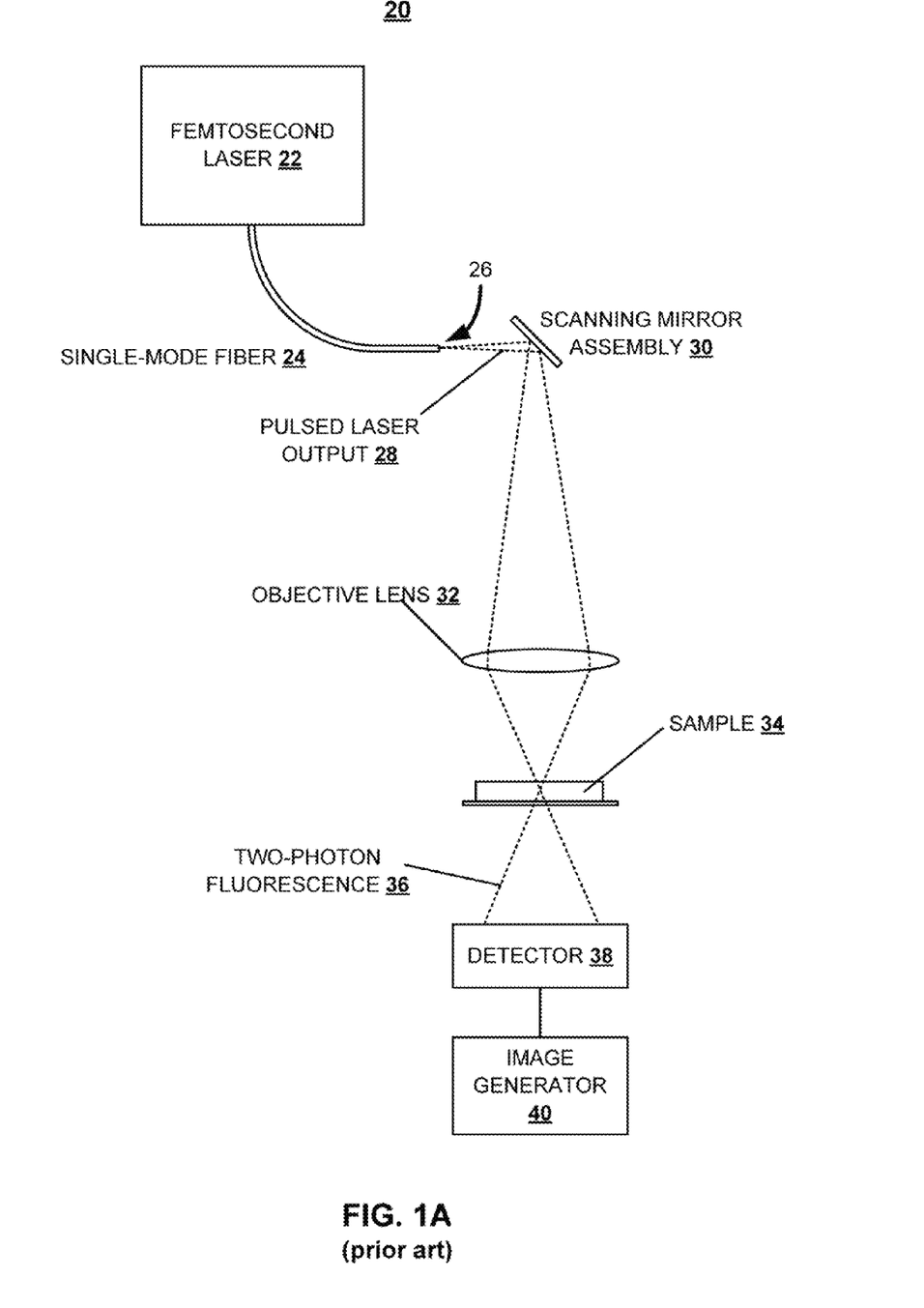
FIGS. 1A and 1B are drawings of exemplary non-linear microscopy systems according to the prior art.

FIG. 1A is a diagram illustrating the basic principles of operation of an exemplary non-linear microscopy system 20 according to the prior art. A femtosecond laser 22 provides incident light in the form of a pulsed laser output that is guided by a single-mode fiber (SMF) 24 having an end face 26 that provides the pulsed laser beam 28 as a free-space output. The laser beam 28 is directed by a scanning mirror assembly 30 to an objective lens 32 that focuses the beam onto a sample 34 for which a microscopic image is to be generated. The laser beam 28 has an intensity that is sufficient to cause multiphoton excitation of fluorophores in an excitation volume of the sample. Fluorescence 36 is emitted having an intensity level indicating the amount of multiphoton excitation for example two-photon fluorescence.

The number of photons required for excitation depends upon the particular type of light-matter interaction used to create fluorescence. In the present discussion, microscopy system 20 is assumed to use two-photon excitation. However, it will be appreciated that the present discussion applies to non-linear microscopy employing other types of light-matter interactions, including second-harmonic generation, third-harmonic generation, Raman scattering, and the like.

The emitted fluorescence is detected by a suitable detector 38, such as a photodiode, photomultiplier, or like device. Scanning the focused laser beam 28 over a region of the sample allows point-by-point intensity data to be gathered. Alternatively, the position of the beam could be kept fixed and the sample scanned in position with respect to the beam. An image generator 40 then uses the intensity data to generate a microscopic image of the scanned sample region.

Figure 1B:
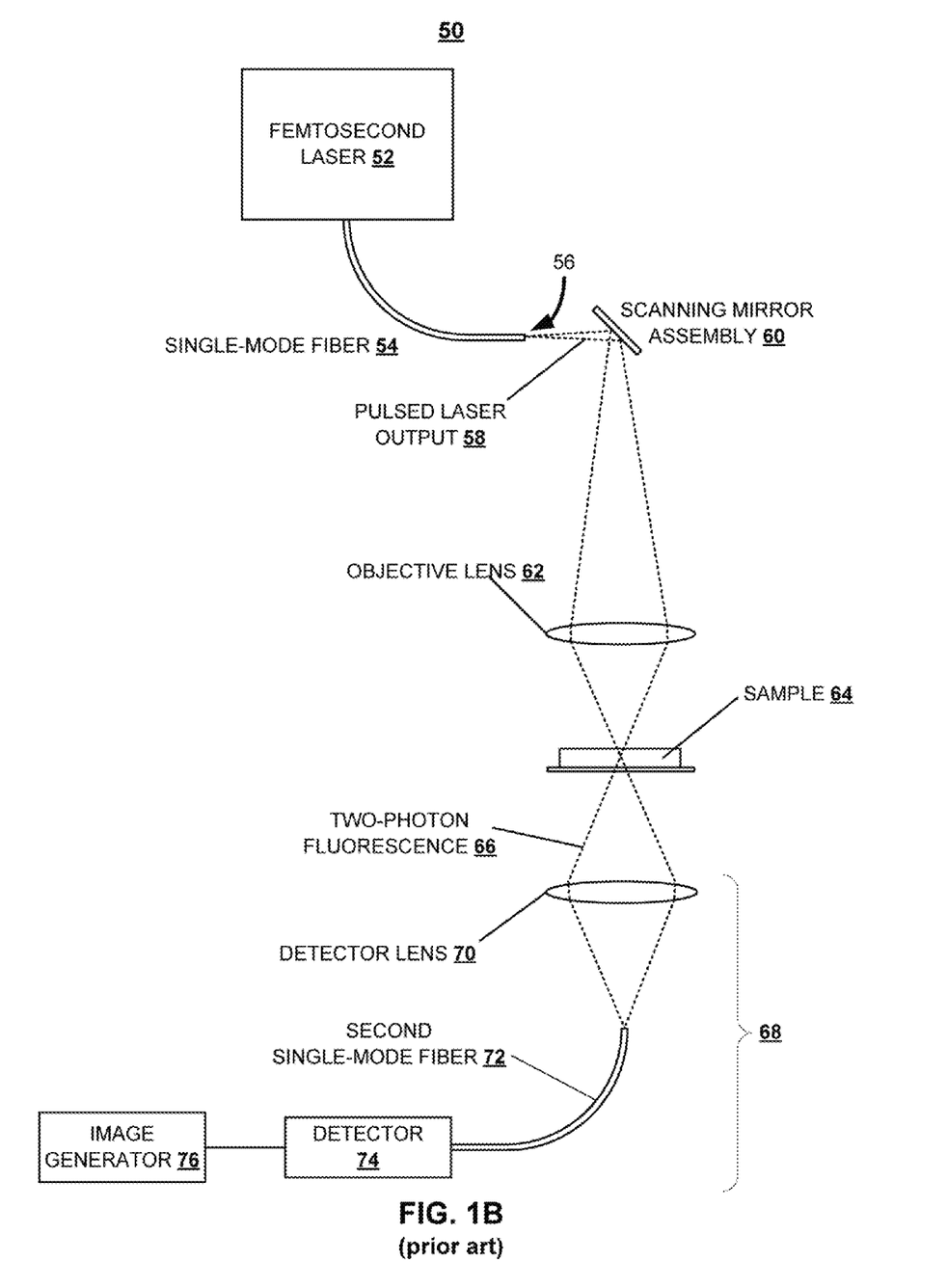

FIG. 1B shows a diagram of a scanning confocal non-linear microscopy system 50 according to the prior art. Like the microscopy system shown in FIG. 1A, system 50 includes a femtosecond laser 52 and a single mode fiber 54 having an end face 56 that provides a pulsed laser output 58. A scanning mirror assembly 60 directs the laser output 58 to an objective lens 62 that tightly focuses it onto a sample 64, thereby resulting in multiphoton excitation of fluorophores in an excitation volume and the emission of fluorescence 66.

The FIG. 1B microscope includes an output pinhole assembly 68, which is provided by a using a detector lens 70 to focus the emitted fluorescence and provide it as an input into a second single-mode fiber (SMF) 72, which in turn guides the focused fluorescence to a detector 74, which provides fluorescence intensity data to image generator 76. The use of pinhole assembly 68 adds depth (i.e., axial) resolution to the microscopy system 50, as only signals generated in the focus of the incident light beam can efficiently couple into the second SMF 70 for measurement by the detector 72. With this setup, a three-dimensional non-linear image of a sample can be obtained by scanning the sample transversely, as well as axially.

In the microscopy systems shown in FIGS. 1A and 1B, the pulsed laser beam used to provide incident light to the sample is guided from the laser to the objective lens using the fundamental $LP_{01}$ transverse mode, which has a near-Gaussian shape. In both systems 20, 50, the single-mode fiber 24, 54 that guides the laser beam to the objective lens does not support propagation in higher-order modes, which have distinctly non-Gaussian shapes.

Because of its near-Gaussian shape, an $LP_{01}$ mode laser beam can be focused to a narrower beam width than a higher-order mode laser beam. For this reason, current non-linear microscopy systems have used an $LP_{01}$ mode laser beam to provide incident excitation light. The localization of excitation in a non-linear optical system typically results in significantly higher spatial resolution than that achievable in a linear optical system. However, it would be desirable to improve the performance of microscopy systems even further. In particular, it would be desirable to find ways to enhance the signal resolution in multiple dimensions.

SUMMARY OF THE INVENTION

Aspects of the invention are directed to improved non-linear optical systems and techniques. An embodiment of the present invention depicts a non-linear optical system comprising a source, such as a laser, and a light delivery system comprising a single mode fiber, a mode converter, and a high order mode fiber, wherein the light delivery system that receives light from the source and provides a structured free-space beam having an embedded Gaussian beam, wherein the embedded Gaussian beam has a width. The light delivery system functions to illuminate a region of a sample and generate a non-linear response in a spatial region that is smaller than a spatial region that would be obtained with a Gaussian beam having a width comparable to the width of the embedded Gaussian beam. Such non-linear responses may include, for example, second-harmonic generation or multi-photon material modification. Because of the structured nature of the beam, the spatial extent over which the non-linear effect is present is smaller than would be achieved with a Gaussian shaped beam.

According to another embodiment of the present invention, a non-linear optical system comprising a source, such as a laser, and a light delivery system that receives light from the source and provides a structured free-space beam, wherein the light delivery system illuminates a region of a sample and generates a non-linear emission of radiation, is depicted. A further aspect of this embodiment includes an imaging assembly for detecting the non-linear emission and using a signal derived from the detected emission to generate a microscopic image of the sample.

According to another aspect of the invention, a long-period grating is used as a mode converter. According to a further aspect of the invention, the higher-order mode of the laser light is created within an optical waveguide, while in another it is created outside of the waveguide using bulk-optic elements.

DETAILED DESCRIPTION

Although the detailed description describes systems primarily surrounding non-linear microscopy, one of ordinary skill will appreciate the scope of the invention encompasses other non-linear optical systems and techniques employing higher-order mode optical fibers.

In the case of a non-linear microscope, a higher-order mode excitation light can provide superior resolution compared with a fundamental $LP_{01}$ mode incident excitation light. The superior resolution arises from the respective shapes of the intensity profile of the higher-order mode or modes compared to the profile of the fundamental mode, and from the non-linear relationship between incident light intensity and fluorescence.

Aspects of the present invention are described in the context of using the $LP_{01}$ and $LP_{02}$ modes used to provide excitation light in a two-photon non-linear microscope. However, it will be appreciated that the following discussion may be extended to other higher-order modes and other types of non-linear microscopes. In addition, it should be noted that creation and detection of fluorescence is but one example of an application that exploits the high spatial confinement of a high intensity region of the laser light. The confined laser light may be used to induce any number of non-linear effects, such as promotion of a multiphoton chemical reaction or material breakdown. As used herein, systems used to implement such applications are generally referred to as "non-linear optical systems."

The present discussion makes use of the $M^2$ parameter and the concept of an "embedded Gaussian" beam. The $M^2$ parameter is a measure of beam quality, i.e., the ability to be focused to a tight spot. The lowest possible value for $M^2$ is 1, which corresponds to a Gaussian beam. For a given light beam, the $M^2$ parameter is determined based upon the beam's divergence angle and width at its narrowest point, and quantifies how many times diffraction-limited the given beam is compared with a Gaussian beam.

Even higher-order modes, such as the $LP_{02}$, $LP_{03}$, and $LP_{04}$ modes, have a non-Gaussian shape that includes a central lobe and one or more outer rings. In determining the $M^2$ values for these shapes, beam width is defined as the second moment of the transverse intensity distribution.

The "embedded Gaussian" beam is a useful concept for understanding how non-Gaussian beams propagate through optical systems. If a Gaussian beam propagating through an optical system has a position-dependent beam width, $\omega(z)$, then it is possible to express the beam width of a non-Gaussian beam propagating through the same optical system, and having a known $M^2$ parameter, as $M \cdot \omega(z)$, i.e., the product of the position-dependent beam width $\omega(z)$ and M, the square root of the $M^2$ value.

Using this concept, it will be seen that for a non-Gaussian beam, comparing its performance to the embedded Gaussian beam performance gives a measure of the resolution enhancement available to non-Gaussian beams.

Figure 2A:
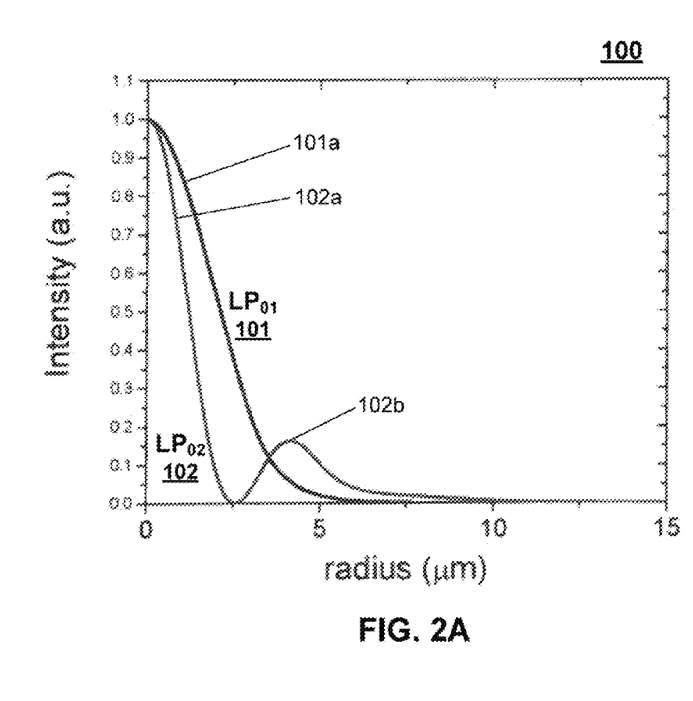
FIG. 2A is a graph comparing the respective intensity profiles of the $LP_{01}$ and $LP_{02}$ modes.

FIG. 2A shows a graph 100, in which curve 101 shows the intensity profile for the $LP_{01}$ mode and curve 102 shows the intensity profile for the $LP_{02}$ mode. The two profiles have been scaled to have the same embedded Gaussian beam-width $\omega(z)$ to provide a direct visual comparison between them. The $LP_{01}$ mode intensity profile closely approximates a Gaussian shape, with a single central lobe 101a. The $LP_{02}$ curve is characterized by a non-Gaussian shape having a central lobe 102a and an outer ring 102b.

The $LP_{01}$ mode has an $M^2$ value of just over 1, reflecting its near-Gaussian shape. The $LP_{02}$ mode has a non-Gaussian energy distribution. Using the second moment definition of beam width, the $M^2$ value for the $LP_{02}$ mode shown in FIG. 2A is approximately 3, and the M value is approximately 1.7.

In a two-photon microscope, the relationship between incident light intensity and fluorophore excitation is quadratic. Thus, in comparing the respective resolutions achievable in a two-photon microscope using the $LP_{01}$ mode and the $LP_{02}$ mode, it is necessary to square their respective intensity profiles. The unsquared $LP_{01}$ and $LP_{02}$ mode intensity profiles can be viewed as indicating the probability that a single photon will be present at a given location at a given time. Thus, the square of the respective intensity profiles can be viewed as indicating the probability that two photons will be simultaneously present at a given location.

Figure 2B:
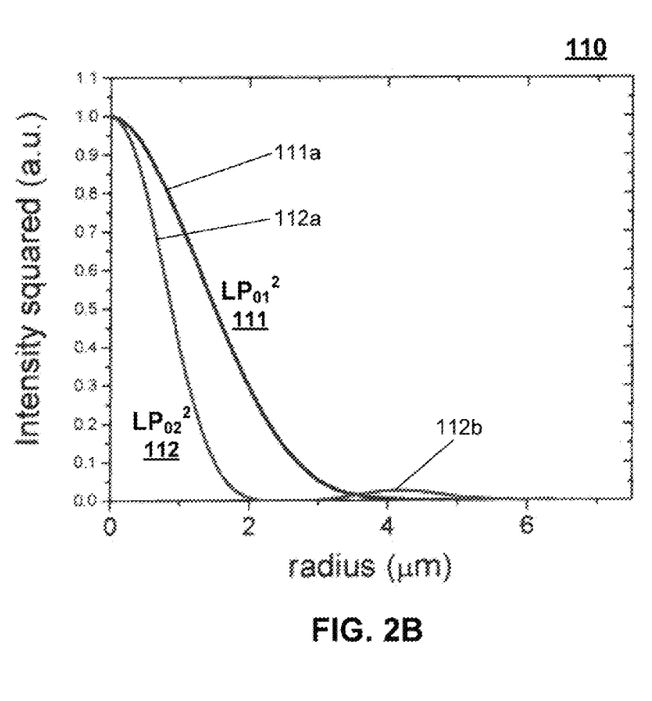
FIG. 2B is a graph comparing the squared intensity profiles of the $LP_{01}$ and $LP_{02}$ modes.

FIG. 2B shows a graph 110 in which curve 111 shows the squared intensity profile for the $LP_{02}$ mode and curve 112 shows the squared intensity profile for the $LP_{02}$ mode. After squaring, the $LP_{02}$ mode outer ring 112b has been substantially suppressed, and the central lobe 112a is now dominant.

The dominant central lobe 112a of the squared $LP_{02}$ mode intensity profile 112 is significantly narrower that the central lobe 111a of the squared $LP_{01}$ mode intensity profile 111. Thus, even though the beam width of the $LP_{02}$ mode is significantly greater that the $LP_{01}$ mode beam width, the squared mode intensity profiles indicates that, in a two-photon microscope, the $LP_{02}$ mode provides superior resolution.

Figure 3A:
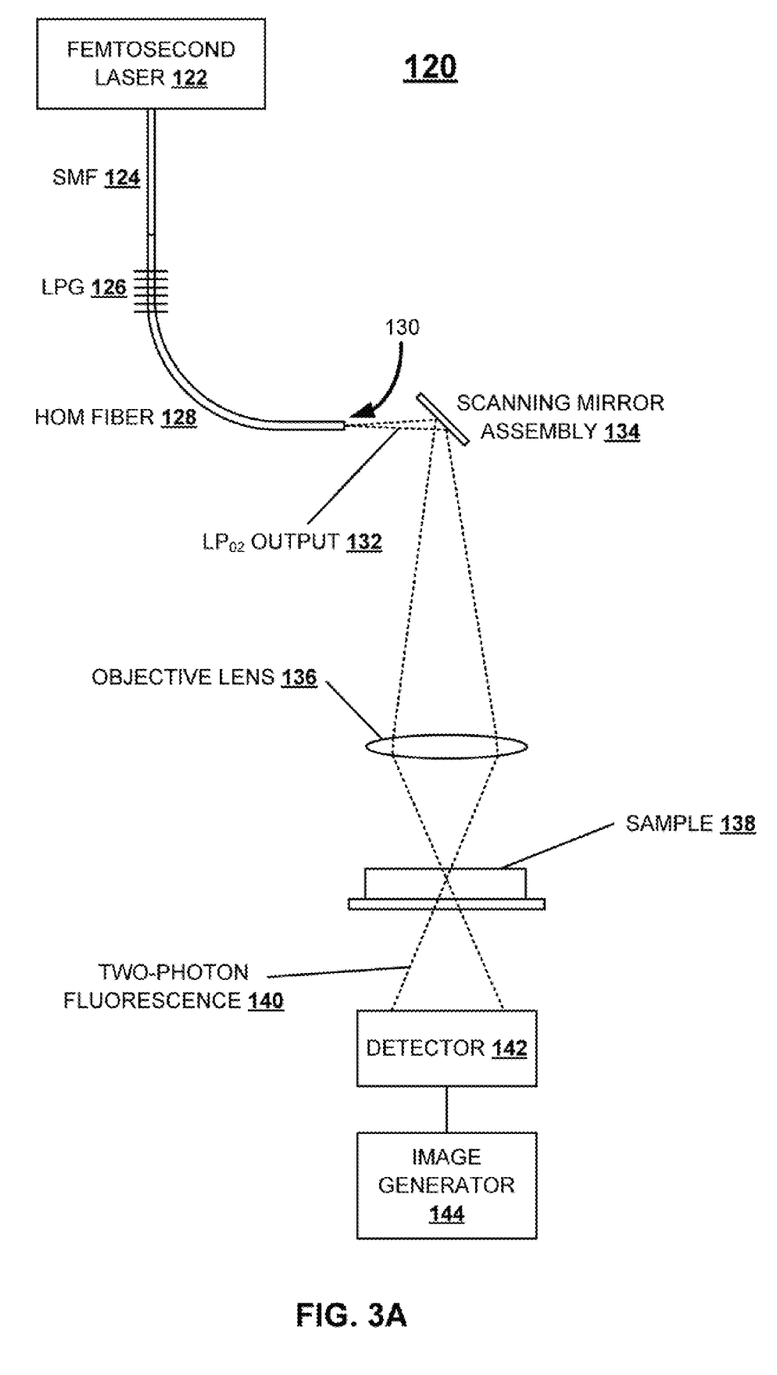
FIGS. 3A and 3B are diagrams of exemplary non-linear microscopy systems according to aspects of the present invention.

FIG. 3A shows a schematic of an exemplary two-photon non-linear microscopy system 120 according to an aspect of the invention, in which a higher-order mode laser beam is used to provide incident excitation light. In the FIG. 3A, microscopy system 120 comprises a laser light source 122, such as a femtosecond laser, to provide a pulsed laser output that is initially guided by a single-mode fiber SMF 124. Alternate light sources may use longer pulses or even generate continuous wave emission, though higher peak power is typically attained using shorter pulses. A long-period grating (LPG) 126 is connected to an output end of the SMF 124 and provides efficient excitation of a desired higher-order mode of the laser output. In the described practice of the invention, LPG 126 is preferably written directly into the HOM fiber 128. It should be noted that, generally speaking, it would also be possible for LPG 126 to be written into a separate fiber, which is then spliced to the HOM fiber 128. In the present example, the LPG 126 provides excitation of the $LP_{02}$ mode in a higher-order mode (HOM) fiber 128. As discussed below, it would also be possible, to use other higher-order modes, including for example the $LP_{03}$ and $LP_{04}$ modes. Typically, even modes are desired due to their high localized peak intensity at the centerline.

In addition, since light outside of the central region does not contribute to non-linear interactions, it is beneficial to use low-order higher-order modes since a larger fraction of the total power is present in the central lobe. In contrast, in so-called "Bessel beams," optical power is distributed to many concentric rings, reducing the relative power carried in the center compared to the rings. In low-order modes, a greater fraction of the total power is carried in the central lobe, which is desirable for many nonlinear interactions. Thus, as used herein, a "higher-order mode of low order" refers to a fiber-guided higher-order mode having a central lobe, and which is commonly characterized as an $LP_{0n}$ mode, where n is less than 5.

The HOM fiber 128 has an end face 130 from which the higher-order mode laser light is emitted as a structured free-space beam output 132 According to another aspect of the invention, the higher-order mode may be created after the laser light exits the waveguide using bulk-optic elements, such as axicons, phase plates, spatial light modulators, and the like. However, one advantage of a waveguide-based mode converter is the excitation of a specific mode or modes with little light coupled into unwanted modes compared to using bulk-optic elements. This allows for more efficient utilization of optical power. For the purposes of the present description, a beam exiting a waveguide in which the beam propagates as the $LP_{02}$ mode is referred to as an "$LP_{02}$-structured beam." $LP_{02}$-structured beam output 132 is directed by a scanning mirror assembly 134 to an objective lens 136 that tightly focuses the laser light 132 onto a sample 138. Fluorophores in the sample 138 that simultaneously absorb two photons enter into an excitation state, resulting in the emission of fluorescence 140 having an intensity indicating the amount of two-photon excitation occurring within the excitation volume. The focused laser light is scanned over a selected region of the sample 138, thereby providing point-by-point emitted fluorescence intensity data over the scan region. The emitted fluorescence is detected by a suitable detector 142, such as a photodiode or the like. An image generator 144 uses the detected signal to generate a microscopic image of the scanned sample region.

Figure 3B:
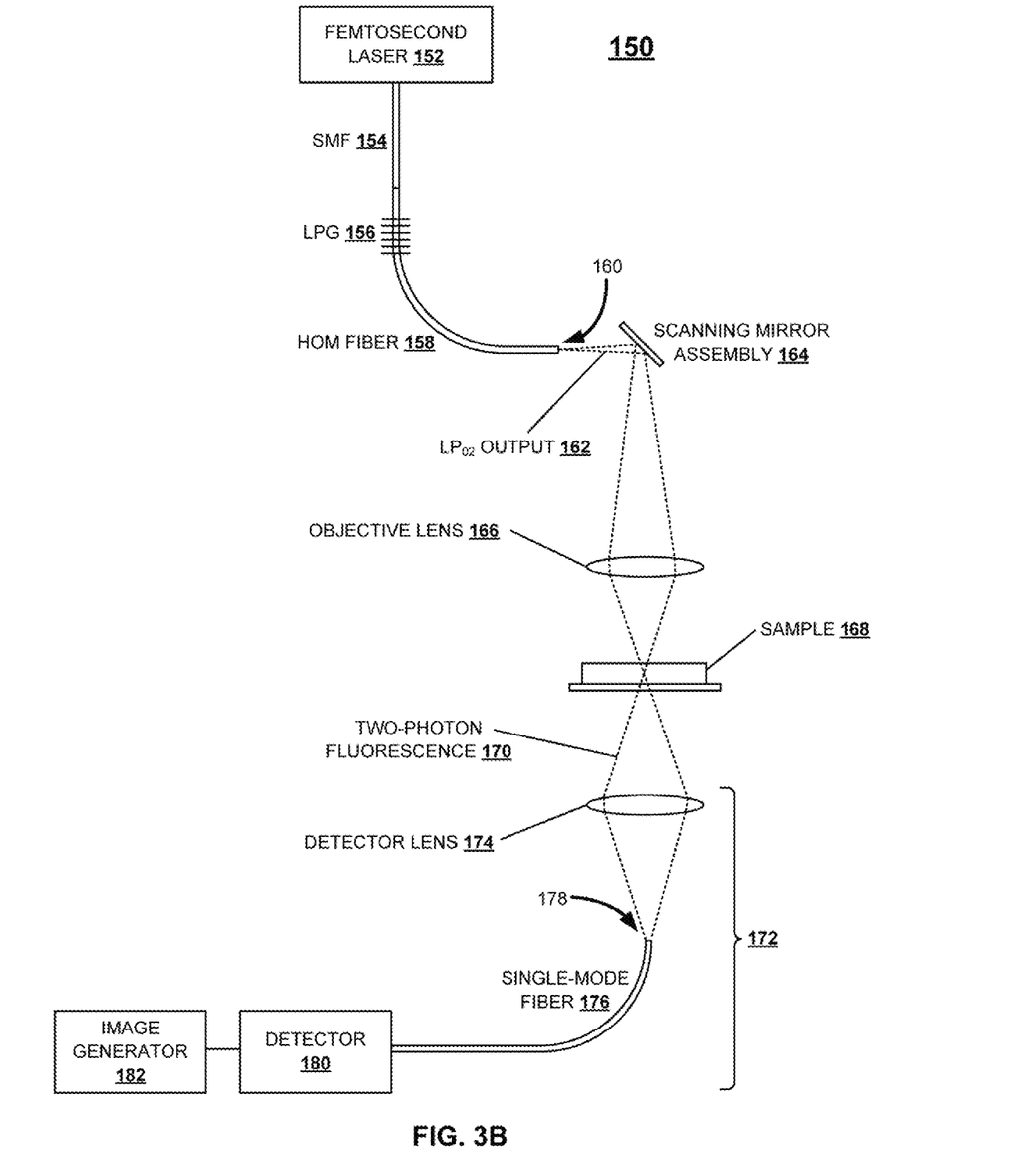

FIG. 3B shows a scanning confocal two-photon microscopy system 150 according to a further aspect of the invention. Similar to the FIG. 3A microscopy system 120, the FIG. 3B microscopy system 150 includes a femtosecond laser 152, a single-mode fiber (SMF) 154, a long-period grating 156, and a higher-order mode (HOM) fiber 158 having an output end face 160 that provides an $LP_{02}$ mode pulsed laser beam 162 as an output. Laser beam 162 is guided by a scanning mirror assembly 164 and focused by an objective lens 166 onto a sample 168, resulting in the emission of two-photon fluorescence 170.

The FIG. 3B microscopy system 150 further includes an output pinhole assembly 172, comprising a detector lens 174, a second single-mode fiber 176 having an input end face 178 and a second long-period grating 180 written into the second single-mode fiber 176. The detector lens 174 focuses emitted fluorescence 170 onto end face 178. This fluorescence is then guided by the second single-mode fiber 176 to the second long-period grating 180. The focused emitted fluorescence is then guided to a detector 182. An image generator 184 then uses the fluorescence data to generate a microscopic image of the scanned sample region.

The output pinhole assembly 172 adds depth (i.e., axial) resolution to the microscopy system 150, as only signals generated in the focus of the beam can efficiently couple into the second single-mode fiber 176 for measurement by the detector. With this setup, three-dimensional non-linear images of samples can be obtained by scanning the sample both transversely and axially.

It should be noted that under non-linear excitation, two-photon fluorescence, or any emission induced by non-linear optical processes, will not look like a higher-order mode, but more like the fundamental mode, because the center peak is emphasized in the non-linear signal, as shown in FIG. 2B. Therefore, for a non-linear confocal microscope based on an HOM fiber, the output pigtail should not be an NOM fiber, but rather a single-mode fiber. In a linear confocal microscope, the output fiber would still have to be an HOM fiber.

The use of NOM fiber 128, 158, in the FIGS. 3A and 3B microscopy systems improves both transverse resolution in a non-linear microscope as well as confocal resolution. HOM fiber is attractive in this application for a number of reasons, including its compatibility with an all-fiber setup, and its compatibility with femtosecond pulse delivery.

The high dispersion of the HOM fiber enables better pulse delivery than SMF fiber. In particular, the dispersive properties of the HOM fiber can be engineered to compress or stretch the pulse during propagation, resulting in a more desirable pulse shape incident on the sample. Long-period grating technology enables efficient excitation of the desired higher-order mode and can also provide wavelength selectivity due to the resonant nature of the mode conversion. There are numerous examples of mode converters in the art, including those created using long-period gratings in waveguides. The spike-shaped central lobe of the squared $LP_{02}$ mode intensity profile, discussed above, enables increased transverse resolution in a non-linear microscope compared to the $LP_{01}$ mode. The high $M^2$ value of the $LP_{02}$ mode (approximately 3) enables increased confocal resolution compared to the $LP_{01}$ mode.

Figures 4, 5:
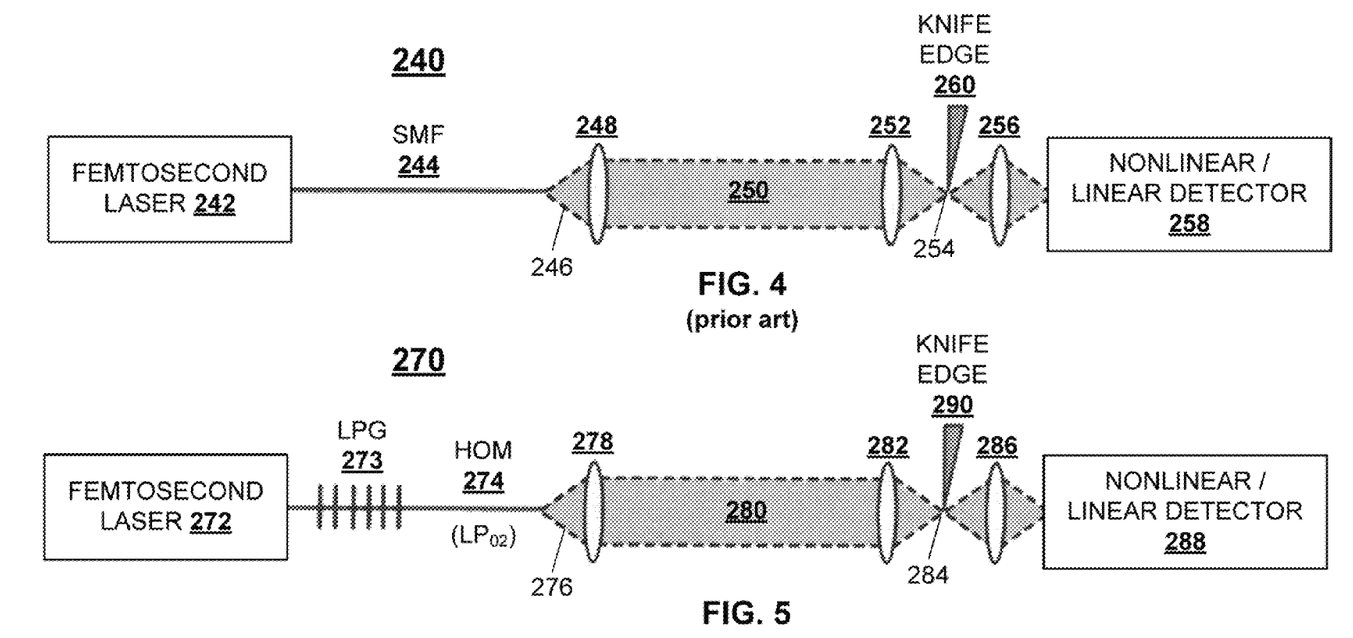
FIGS. 4 and 5 are a pair of diagrams illustrating testing setups for comparing the resolution achievable by a non-linear microscopy system using the $LP_{01}$ and $LP_{02}$ modes.

FIGS. 4 and 5 are a pair of schematic diagrams illustrating testing setups 240, 270 that are designed to compare the resolution of a non-linear microscopy system using an $LP_{01}$ mode to one using an $LP_{02}$ mode.

In the FIG. 4 setup 240, a pulsed laser beam from a 1550 nm femtosecond erbium laser 242 propagates in the $LP_{01}$ mode of a single-mode fiber 244. In the FIG. 5 setup 270, a pulsed laser beam from a 1550 nm femtosecond erbium laser 272 is guided into a long-period grating 273 that excites the $LP_{02}$ mode of a higher-order mode fiber 274.

In both testing setups 240, 270, the fiber laser output 246, 276 is collimated by a first lens 248, 278. The collimated light 250, 280 is then focused by a second lens 252, 282. The focus 254, 284 is then imaged by a third lens 256, 286 onto a suitable linear or non-linear detector 258, 288, such as an indium gallium arsenide (InGaAs) photodiode, a silicon (Si) photodiode, or the like, that produces a two-photon photocurrent.

A knife edge 260, 290 is translated through the focus 254, 284 of the beam and the amount of photocurrent on the detector 258, 288 is measured as a function of the knife edge position. The steepness of this curve versus position is a measure of the resolution of the microscope.

The lenses are chosen such that both beams have the same embedded Gaussian width in the collimated region 250, 280 just before the focusing lens 252, 282. This ensures that at the beam focus. 284 the $LP_{02}$ beam is approximately M times larger in width than the $LP_{01}$, where the $M^2$ of the $LP_{02}$ beam is approximately 3.

Figure 6A:
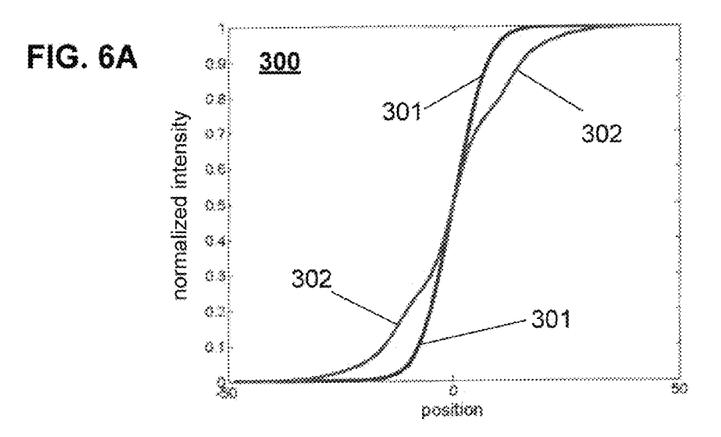
FIGS. 6A-6C are a series of graphs showing the theoretical signals expected based on the computed intensity profiles for the $LP_{01}$ and $LP_{02}$ modes.
Figure 6B:
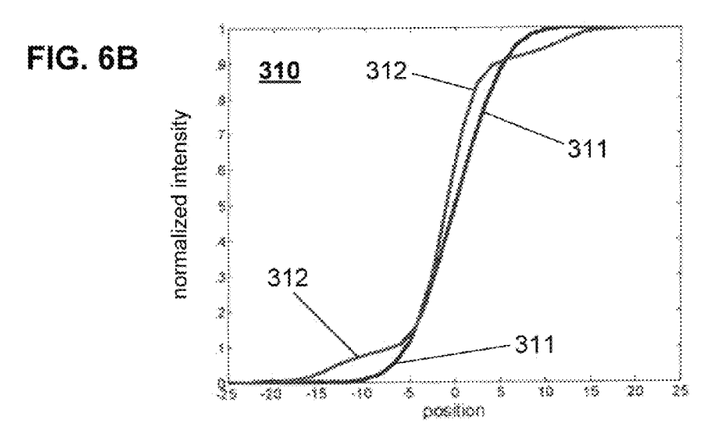
Figure 6C:
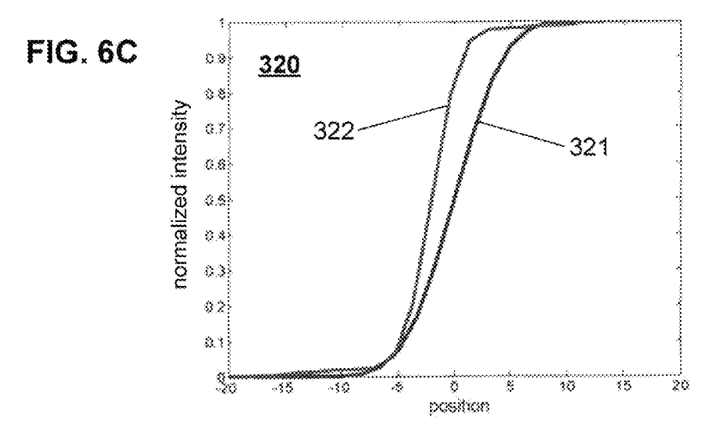

FIGS. 6A-6C are a series of graphs 300, 310, 320 showing the theoretical signals expected based on the computed intensity profiles for the $LP_{01}$ and $LP_{01}$ modes.

The FIG. 6A graph 300 shows the signal vs. knife edge position for the $LP_{01}$ mode (curve 301) and the $LP_{02}$ mode (curve 302) if the detector responds linearly to the intensity of the beam.

The FIG. 6B graph 310 shows the signals for the $LP_{01}$ mode (curve 311) and $LP_{02}$ mode (curve 312) for a second-order non-linear detector that responds to the intensity squared. In the case of the linear detector, the $LP_{02}$ curve is dominated on the edges by the outer ring, and thus the slope of the curve is smaller than for the $LP_{01}$ beam. However, for the non-linear detector the outer ring of the $LP_{02}$ beam is suppressed, and the slope of the $LP_{02}$ curve is sharper than the $LP_{01}$, showing the potential for increased resolution for the $LP_{02}$ beam in an apparatus which exploits non-linear or multi-photon interaction with matter, such as a microscope.

The FIG. 6C graph (320) shows the signals for the $LP_{01}$ mode (curve 321) and $LP_{02}$ mode (curve 322) for a third-order non-linear detector. An even greater expected improvement is shown, with further suppression of the wings and a resolution for the $LP_{02}$ which is almost twice that of the $LP_{01}$.

Figure 7A:
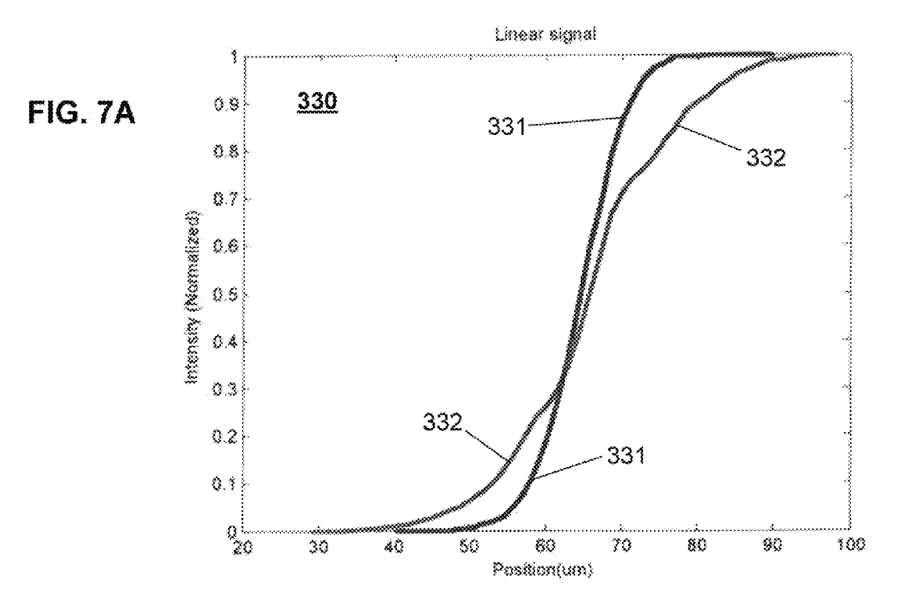
FIGS. 7A and 7B are graphs showing experimentally measured curves for a linear detector and a second-order non-linear detector.
Figure 7B:
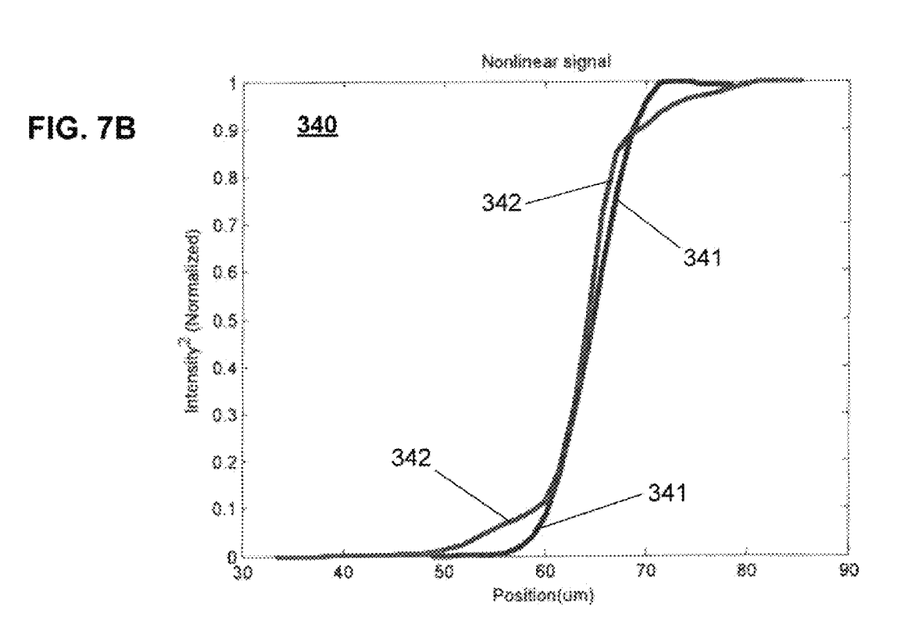

FIG. 7A is a graph 330 showing experimentally measured curves for the $LP_{01}$ mode (curve 331) and the $LP_{02}$ mode (curve 332) for a linear detector 258, 288. FIG. 7B is a graph 340 showing experimentally measured curves for the $LP_{01}$ mode (curve 341) and the $LP_{02}$ mode (curve 342) for a non-linear detector 258, 288. Third-order measurements were not made in these experiments.

Note the correspondence between the experimental curves 331, 332, 341, and 342 in FIGS. 7A and 7B and the theoretical curves 301, 302, 311, and 312 in FIGS. 6A and 6B. In the case of linear detection (curves 301, 302, 331, and 332), the $LP_{02}$ provides relatively poor resolution due to the outer ring, but for non-linear detection (curves 311, 312, 341, and 342) the outer ring is suppressed, the central spike dominates, and the slope of the $LP_{02}$ measurement is larger than the slope for the $LP_{01}$. The benefit of higher-order modes would be even greater for higher-order non-linearities such as third-harmonic generation, which would provide better suppression of the $LP_{02}$ outer ring.

These measurements show that the transverse resolution of the $LP_{02}$ can be better than the transverse resolution of the $LP_{01}$ in a non-linear microscope. HOMs also add increased benefit in the confocal setup due to the faster diffraction of beams with large $M^2$ values.

Figure 8A:
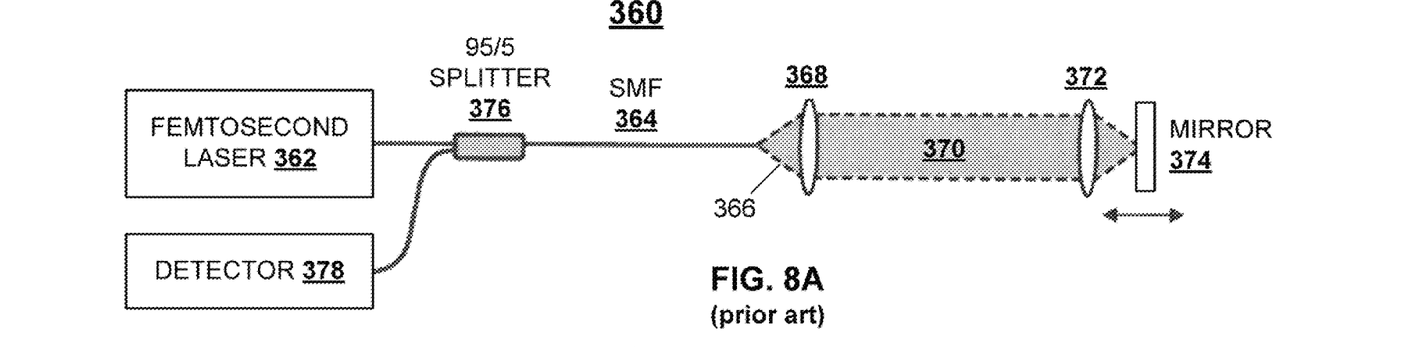
FIGS. 8A and 8B are a pair of diagrams of an experimental setup for comparing the confocal resolution of the $LP_{02}$ mode to that of the $LP_{01}$ mode.
Figure 8B:
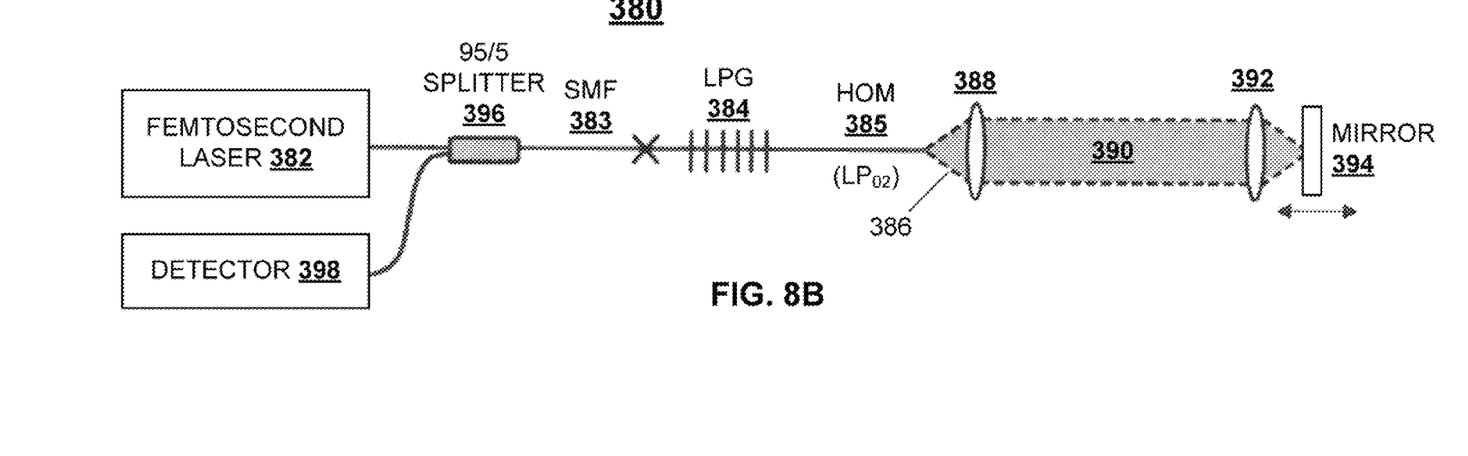

FIGS. 8A and 8B show experimental setups 360, 380 for comparing the confocal resolution of the $LP_{02}$ mode to the $LP_{01}$ mode. In the FIG. 8A setup 360, a pulsed laser beam from a femtosecond laser 362 propagates in the $LP_{01}$ mode of a single-mode fiber 364. In the FIG. 8B setup 380, a pulsed laser beam from a femtosecond laser 382 is guided by a single-mode fiber 383 into a long-period grating 384 that excites the $LP_{02}$ mode of a higher-order mode fiber 385.

In both testing setups 360, 380, the fiber laser output 366, 386 is collimated by a first lens 368, 388. The collimated light 370, 390 is then refocused by a second lens 372, 392 onto a mirror 374, 394 that is scanned axially. The reflected power from the beam propagates back through the optical system and is coupled back into the fiber 364, 385. The backward propagating power is detected through the 5% tap of a 95/5 splitter 376, 396. A circulator may also be used beneficially in the place of the tap. The reflected optical power is plotted as a function of mirror position.

Figure 9A:
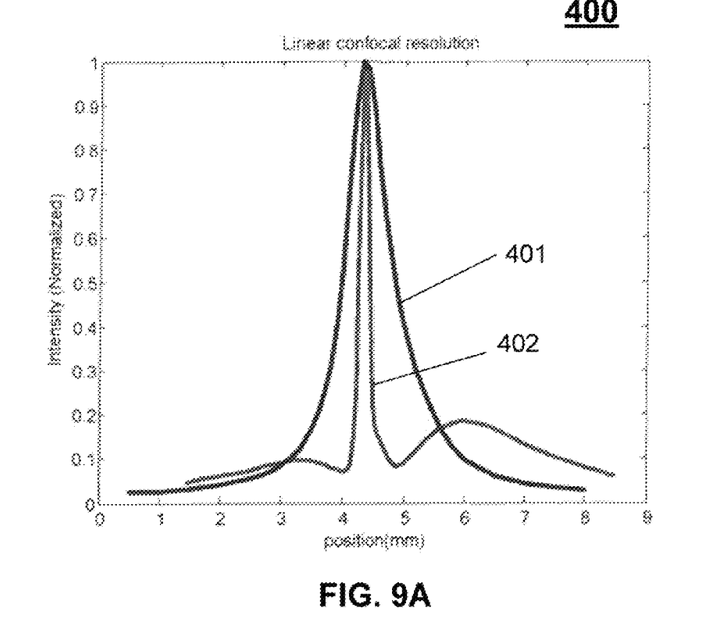
FIGS. 9A and 9B are a pair of graphs showing the measured confocal signal for a linear detector and a second-order non-linear detector.

FIG. 9A is a graph 400 shows the measured confocal signal for a linear detector. Even for the linear detection, the $LP_{02}$ (curve 402) has a much sharper response curve compared to the $LP_{01}$ (curve 401) due to the large $M^2$ value of the $LP_{01}$.

Figure 9B:
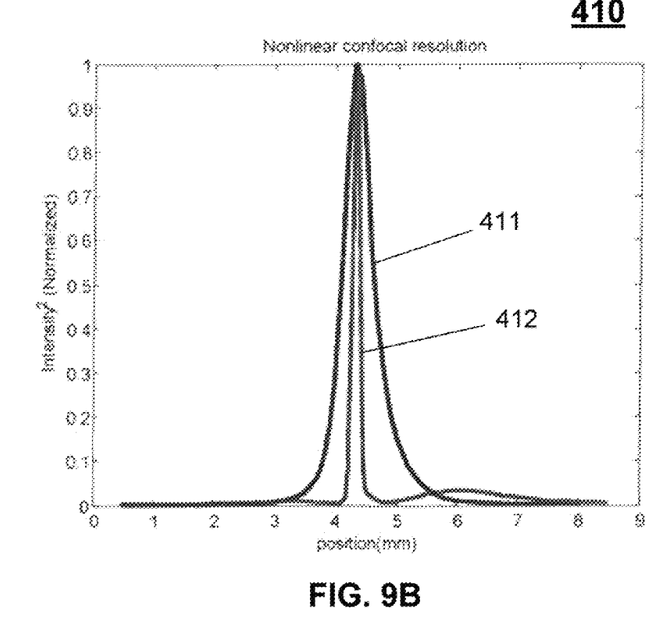

In FIG. 9B is a graph 410, the response of a non-linear detector is simulated by squaring the signal from the linear detector. As can be seen in FIG. 9B, non-linear confocal microscopy with the $LP_{02}$ mode (curve 412) offers much sharper confocal response as compared to the $LP_{01}$ mode (curve 411).

According to a further aspect of the invention, the higher-order mode fibers described herein are optimized for particular applications of a non-linear microscope. Generally speaking, it is possible to optimize the mode shape to obtain better resolution in a higher-order mode non-linear microscope compared to a non-linear microscope employing $LP_{01}$ incident light.

Through fiber design, the mode shape could be adjusted in the following ways:

1. The $M^2$ value of the fiber can be adjusted. A lower $M^2$ value will potentially allow tighter focusing at the focal plane.

2. The fraction of power in the center lobe and the outer ring of the $LP_{02}$ mode can be adjusted. Less power in the outer ring would decrease its influence in second order non-linear measurements.

3. The amplitude and width of the outer rings could be traded off. By decreasing the amplitude of the outer ring, while simultaneously increasing the width, the power in the outer ring could be kept constant, decreasing the impact of the outer ring on non-linear measurements.

4. The center lobe could potentially be made narrower, increasing the resolution.

5. Different order modes, such as $LP_{03}$ or $LP_{04}$, or combinations thereof could be used. In cases where multiple modes are combined, care must be taken with the relative phase relationship between modes to ensure that the beams combine in the desired fashion, e.g., constructively, on the sample.

It is important to note that all of these design adjustments are interrelated. For exampling, adjusting the fraction of power in the outer ring, or its width and amplitude, will also change the $M^2$ of the beam.

Figure 10:
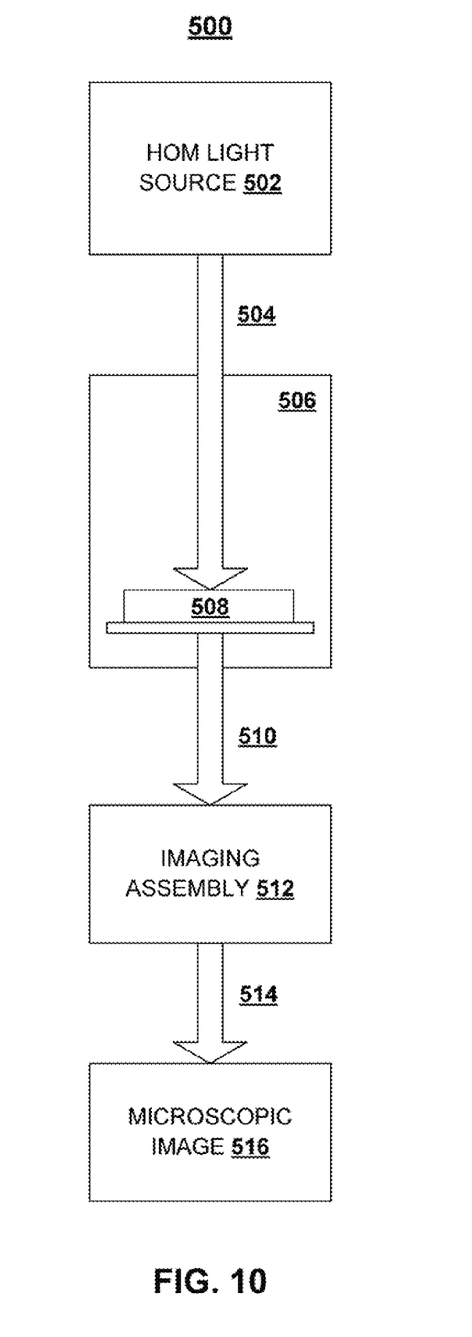
FIG. 10 is a diagram illustrating a general example of a non-linear microscopy system according to aspects of the invention.

FIG. 10 a diagram of a general non-linear optical system 500 according to aspects of the present invention. System 500 includes an NOM light source 502 that provides as an output 504 a structured free-space beam. An illumination assembly 506 uses output 504 to illuminate a sample 508, thereby generating an optical output 510 therefrom. An imaging assembly 512 then uses a non-linear signal 514 derived from the optical output 510 to generate a microscopic image 514 of the sample 508. In the examples of the invention described above, the non-linear signal comprises a multi-photon fluorescence signal. Alternatively, the non-linear signal may comprise, for example, a second-harmonic signal, a third-harmonic signal, a Raman signal, or the like.

Figure 11:
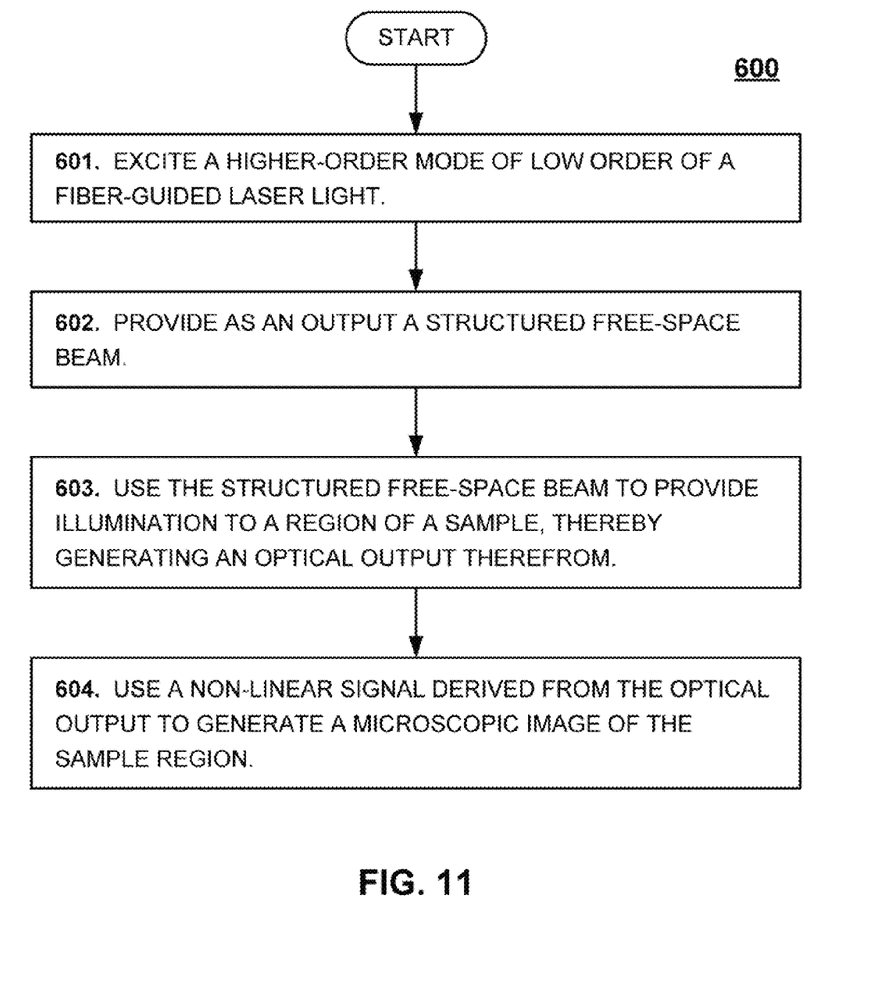
FIG. 11 is a flowchart illustrating a general example of a non-linear microscopy technique according to aspects of the invention.

FIG. 11 is a flowchart of a general non-linear microscopy technique 600 according to aspects of the present invention. The method comprises the following steps:

Step 601: Excite a higher-order mode of low order of a fiber-guided laser light.

Step 602: Provide as an output a structured free-space beam.

Step 603: Use the structured free-space beam to provide illumination to a region of the sample, thereby generating an optical output therefrom.

Step 604: Use a non-linear signal derived from the optical output to generate a microscopic image of the sample region.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

We claim:

1. A non-linear optical system, comprising:
   a source; and
   a light delivery system for receiving light from the source and providing a structured free-space beam for illuminating a region of a sample so as to produce a non-linear response in a spatial region of the sample,
   wherein the light delivery system is configured such that the structured free-space beam delivered to the sample region has a non-Gaussian shape, and
   wherein the non-Gaussian shape is structured such that the spatial region of the non-linear response produced by the structured free-space beam has a width that is smaller than the width of the spatial region of the non-linear response that is produced when the sample is illuminated solely by an embedded Gaussian beam of the structured free-space beam.

2. The system of claim 1, further comprising an illumination assembly for using the structured free-space beam.

3. The system of claim 2, wherein the illumination assembly includes a lens for focusing the structured beam onto the sample.

4. The system of claim 2, wherein the illumination assembly includes a scanning assembly for scanning the structured beam over the sample.

5. The system of claim 2, wherein the illumination assembly includes a scanning assembly for scanning the sample over the structured beam.

6. The system of claim 1, wherein the source is a laser.

7. The system of claim 1, wherein the light delivery system comprises a single mode fiber, a mode converter, and a high-order mode fiber.

8. The system of claim 7, wherein the mode converter excites an $LP_{02}$ mode of the fiber.

9. The system of claim 7, wherein the mode converter excites at least one low order higher-order mode.

10. The system of claim 7, wherein the mode converter is a long period grating.

11. The system of claim 7, wherein the higher-order mode fiber has a length for generating compressed pulses at an output end face.

* * * * *